United States Patent

[11] 3,619,790

[72] Inventor Richard N. Brooksbank
Beeston, England

[21] Appl. No. 19,187

[22] Filed Mar. 13, 1970

[45] Patented Nov. 9, 1971

[73] Assignee The Plessey Company Limited
Ilford, Essex, England

[32] Priority Apr. 26, 1969

[33] Great Britain

[31] 21,425/69

[54] CIRCUIT FOR SELECTIVELY SUPPRESSING A PULSE IN A PULSE TRAIN
1 Claim, 3 Drawing Figs.

[52] U.S. Cl. .......... 328/99, 307/217, 307/247, 328/165

[51] Int. Cl. .......... H03k 17/26

[50] Field of Search .......... 328/60, 71, 93, 99, 165; 307/216, 217, 241, 247, 291

[56] References Cited

UNITED STATES PATENTS 2,636,133 4/1953 Hussey .......... 307/216

3,007,115 10/1961 Batley .......... 328/93 X

*Primary Examiner*—Stanley T. Krawczewicz
*Attorney*—Blum, Moscovitz, Friedman & Kaplan

ABSTRACT: A circuit for selectively suppressing a pulse in a pulse train utilizing first and second bistable devices and first and second two input gates. The circuit normally permits the passage of a train of pulses from an input terminal, but upon the application of a command signal at a command terminal, a pulse of the train is suppressed without mutilating the other pulses, actual suppression being accomplished by the response of said second bistable device to the trailing edge of the pulses of said pulse train.

CIRCUIT FOR SELECTIVELY SUPPRESSING A PULSE IN A PULSE TRAIN

This invention relates to electrical pulse trains and is concerned with the problem of suppressing one pulse of a train without mutilating the other pulses.

According to the invention there is provided a circuit arrangement operative in the quiescent state to produce output pulses at an output conductor characterized correspond to pulses of a pulse train applied to an input conductor and adapted to suppress a single one of the output pulses in response to the application of a command signal having a duration embracing the trailing edge of at least two successive pulses of the pulse train characterised in that it comprises a first two-input gate for applying pulses corresponding to pulses of the pulse train to the output conductor, a second two input gate having one input lead connected to the command signal source, and first and second bistable devices, the arrangement being such that in said quiescent state each bistable device is in its reset state whereat the second bistable device firstly conditions the first gate for application of pulses corresponding to pulses of the train to the output conductor and secondly conditions the second gate to respond to an ensuing command signal the response of the second gate to the advent of a command signal being such as to set the first bistable device whereat the second bistable device is adapted to be set on the next occurring trailing edge of a pulse of the pulse train and to be again reset on the trailing edge of the following pulse of the pulse train, the second bistable device serving for the duration of the set state to inhibit the first and second gates and upon resumption of the reset state to cause the second gate to produce an output effective to reset the first bistable device.

Figure 1:
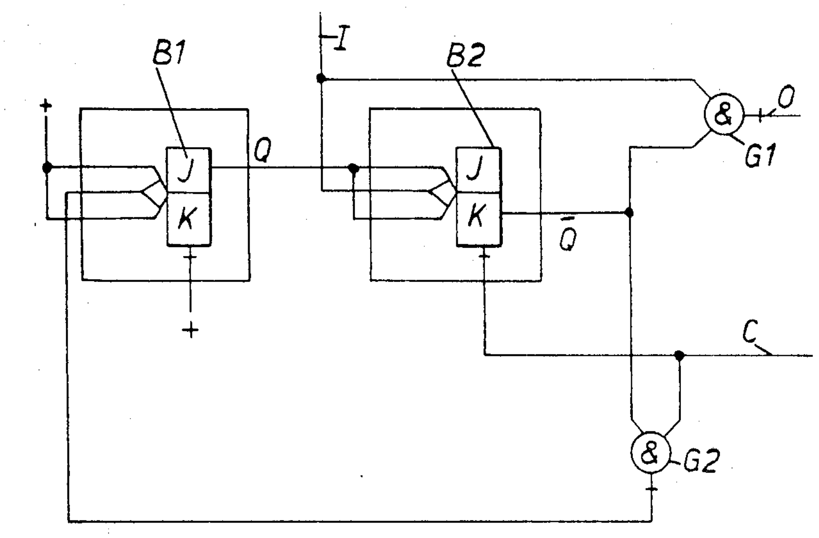
Figures 2A, 2B:
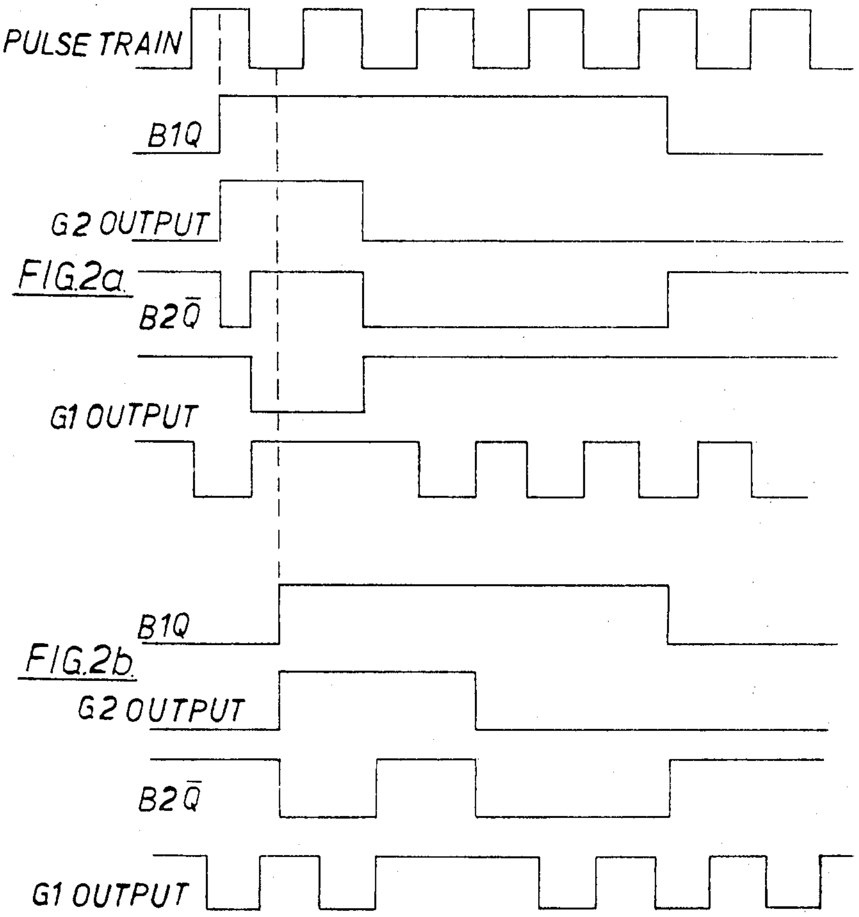

In the accompanying drawings:

FIG. 1 shows circuit arrangement according to the invention,

FIG. 2*a* is a waveform diagram showing the sequence of events when a command signal is applied during a pulse of the pulse train.

FIG. 2*b* a waveform diagram showing the sequence of events when a command signal is applied between pulses of the pulse train.

In FIG. 1, B1, B2 represent first and second bistable devices, delivering outputs designated Q, $\bar{Q}$. Preferably the bistable devices are those known as "Dual master-slave J-K flip-flops type SN7473" described at pages 163–165 of a booklet entitled "Semiconductor and Components Data: Book 2 : 1968" published by Texas Instruments Limited, Manton Lane, Bedford. G1, G2 are the first and second AND gates, I the input conductor, O the output conductor, and C the conductor to which a command signal is applied.

The working of the circuit arrangements is as follows:

In the quiescent condition, both the bistable devices B1, B2 are in the J state. The output Q from the first device B1 is used to prevent the second device B2 responding to pulses of the train of pulses applied to the input conductor I. The output $\bar{Q}$ of the second device B2 primes both of the gates G1, G2. The train of pulses applied to the input conductor I is also applied to the gate G1, and, since this gate is primed, the pulse train is delevered unchanged at the output conductor O.

If now it is desired to suppress one of the pulses of the train applied to the input conductor I, a command signal is applied to a command conductor C. The command signal primes the second bistable device B2 for switching to the K state, opens the gate G2 and switches the first bistable device B1 to the K state. The second device B2 is thus primed for switching to the K state, and is free to respond to the pulses applied to the input conductor I. The second device B2 is designed to operate at the trailing edge of these pulses. One or other of two events now occurs. If the command signal is applied during the application of a pulse to the input conductor I, the second device B2 switches to the K state at the trailing edge of the pulse concerned. Alternatively, if the command signal is applied in the interval between two pulses the second device B2 switches to the K state at the trailing edge of the pulse which follows the interval. With the second device B2 in the K state, both the gates G1, G2 are closed. It should be noted in particular that the gate G1 is closed after delivery of a pulse at the output conductor O, thus ensuring that the pulse concerned is not clipped by the closing of the gate. The next pulse applied to the input conductor I fails to pass the gate G1, and no corresponding pulse is delivered at the output conductor O. The trailing edge of this pulse, however, causes the second bistable device B2 to revert to the J state. The reversion of the device B2 is followed by the priming of gates G1, G2.

Since this priming occurs when no pulse is being applied to the input conductor I, there is no risk of the priming causing a clipped pulse to be delivered at the output conductor O. The command signal is maintained long enough for the priming of gate G2 to take place, i.e. the command signal has a minimum duration embracing the trailing edges of two consecutive pulses of the train applied to the input conductor I. Under these conditions, the gate G2 opens when priming is restored. This causes the first device B1 to revert to the J state, so restoring the output Q which prevents the second device B2 responding to succeeding pulses of the train applied to the input conductor I. The first bistable device B1 is locked in the J state until the command signal is terminated. Hence only one pulse of the train applied to the input conductor I is suppressed by any one command signal. After the command signal is terminated, the first bistable devices B1 remains in the J state until another command signal is applied to the command conductor C. The events already described are then repeated.

What we claim is:

1. An electric circuit for selectively suppressing a pulse in a pulse train in response to a command signal comprising first and second bistable devices both having stable rest and operated states; an input terminal at which said pulse train is received; a first two input gate having an input thereof coupled to said second bistable device for priming when said second bistable device is in the rest state; said first gate having its other input connected to the said input terminal so that the gate repeats said pulse train received at the input terminal while the second bistable device is in the rest state; a command terminal at which said command signal is received; a second two input gate having an input thereof coupled to said second bistable device for priming when said second bistable device is in the rest state, said second gate having its other input connected to said command terminal; means connecting the output of the second gate and said first bistable device so that said first bistable device is switched to its operated state on the opening of the second gate; means connecting said input terminal and said second bistable device; means connecting said command terminal and said second bistable device so that said second bistable device is primed for switching to its operated state in response to the pulse train from said input terminal; and means connecting said first bistable device to said second bistable device so that the switching of the second bistable device is prevented while the first bistable device is in the rest state.

* * * * *